(12) United States Patent
Smith

(10) Patent No.: US 12,420,693 B1
(45) Date of Patent: Sep. 23, 2025

(54) SLIDING SHELF ASSEMBLY FOR A RECREATIONAL VEHICLE

(71) Applicant: Ronald L. Smith, Livingston, TX (US)

(72) Inventor: Ronald L. Smith, Livingston, TX (US)

( * ) Notice: Subject to any disclaimer, the term of this patent is extended or adjusted under 35 U.S.C. 154(b) by 153 days.

(21) Appl. No.: 18/214,929

(22) Filed: Jun. 27, 2023

(51) Int. Cl.
  *B60P 3/36* (2006.01)
  *A47B 46/00* (2006.01)
  *A47B 96/02* (2006.01)

(52) U.S. Cl.
  CPC .............. *B60P 3/36* (2013.01); *A47B 46/00* (2013.01); *A47B 96/025* (2013.01)

(58) Field of Classification Search
  CPC .......... A47B 46/00; A47B 96/025; B60P 3/36
  USPC .................................... 312/235.1, 265.4, 350
  See application file for complete search history.

(56) References Cited

U.S. PATENT DOCUMENTS

| | | | |
|---|---|---|---|
| 5,228,762 A * | 7/1993 | Mascrier | H02B 1/01 312/265.4 |
| 5,709,512 A * | 1/1998 | Smith | B60R 11/00 248/200.1 |
| 6,467,635 B1 * | 10/2002 | McComb | A47F 7/30 211/175 |
| 8,708,169 B1 * | 4/2014 | Chen | F16B 7/187 403/252 |
| 10,556,524 B1 | 2/2020 | Slater | |
| 10,933,923 B1 * | 3/2021 | Wurzer | B60R 7/08 |
| 11,485,271 B1 | 11/2022 | Boyce | |
| 11,535,146 B2 | 12/2022 | Cline | |
| 2004/0036389 A1 * | 2/2004 | Tsai | H05K 7/18 312/265.4 |
| 2006/0124564 A1 | 6/2006 | Furuichi et al. | |
| 2008/0164724 A1 * | 7/2008 | Burnett | B62D 33/0612 182/35 |
| 2008/0282467 A1 | 11/2008 | Edwards | |
| 2009/0153005 A1 * | 6/2009 | Sun | H05K 7/1488 312/235.1 |
| 2011/0036792 A1 * | 2/2011 | Grainger | A47B 67/04 211/79 |
| 2012/0145663 A1 * | 6/2012 | Dykstra | A47B 46/00 211/187 |
| 2018/0133935 A1 * | 5/2018 | Ravellette | B29C 39/265 |
| 2019/0274424 A1 * | 9/2019 | Hanley | A47B 96/067 |
| 2021/0353072 A1 | 11/2021 | Aldrich et al. | |

(Continued)

FOREIGN PATENT DOCUMENTS

| | | | | |
|---|---|---|---|---|
| CA | 2427717 A1 | 11/2003 | | |
| EP | 2532569 | * 12/2012 | | B62D 33/06 |

*Primary Examiner* — James O Hansen
(74) *Attorney, Agent, or Firm* — Cramer Patent & Design, PLLC.; Aaron R. Cramer

(57) ABSTRACT

The sliding shelf assembly for a recreational vehicle may comprise a shelf frame, a first appliance shelf, a first step, and a second step. The sliding shelf assembly for a recreational vehicle may form a sliding shelf that may be mounted in an open space within a recreational vehicle (RV) to hold a first appliance. The first step may be coupled to the shelf frame without interfering with movement of the first appliance shelf and may be adapted for a user to step on in order to get into a bed. The second step may be positioned on top of the first step and may pivot from a deployed position to a non-deployed position to eliminate interference with movement of the first appliance shelf. The first appliance shelf may be swapped with a second appliance shelf to use a second appliance.

12 Claims, 7 Drawing Sheets

(56) References Cited

U.S. PATENT DOCUMENTS

2022/0111781 A1 4/2022 Alpin
2022/0144158 A1 5/2022 Cline

* cited by examiner

SLIDING SHELF ASSEMBLY FOR A RECREATIONAL VEHICLE

RELATED APPLICATIONS

None.

FIELD OF THE DEVICE

The present device relates generally to a shelf assembly and more specifically to a sliding shelf assembly for a recreational vehicle.

BACKGROUND OF THE DEVICE

Camping and going on vacation are two activities that millions of people in the United States love doing in their spare time. Recreational vehicles, also known as RVs, can range in size from lightweight pop-up campers that are intended to be towed behind a car or truck to massive, motorized RVs that have their own engines built in. A significant number of these ardent campers opt to perform their outdoor excursions in RVs. These recreational vehicles include all the conveniences of home, such as huge sofas and reclining chairs.

Unfortunately, the amount of room available for cargo inside such vehicles is extremely limited. Those who want to bring along major equipment like microwaves or refrigerators will have a difficult time doing so unless the RV maker has included the device from the beginning of the production process. Another issue that is typical of most recreational vehicles is that the bed is typically elevated to a considerable height above the floor. This is done so that a variety of mechanical and electrical utility systems can be installed underneath the bed. Unfortunately, this makes it challenging to climb into and out of bed, with the exception of those who are particularly tall. Because of this, there is a demand for a method that can enhance the accessibility of beds and the storage space available for appliances in RVs. The development of the sliding shelf assembly for a recreational vehicle fulfills this need in a manner that is space-efficient and cost-effective.

SUMMARY OF THE DEVICE

Embodiments of the present disclosure may include a sliding shelf assembly for a recreational vehicle including a shelf frame having a shelf frame interior further having a cuboid shape including a first shelf corner post. Embodiments may also include a second shelf corner post. Embodiments may also include a third shelf corner post.

Embodiments may also include a fourth shelf corner post. Embodiments may also include a plurality of shelf left side braces horizontally secured between the first shelf corner post and the second shelf corner post. Embodiments may also include a plurality of shelf rear side braces horizontally secured between the second shelf corner post and the third shelf corner post.

Embodiments may also include a plurality of shelf right side braces horizontally secured between the third shelf corner post and the fourth shelf corner post. Embodiments may also include a plurality of shelf front braces horizontally secured between the fourth shelf corner post and the first shelf corner post. Embodiments may also include a first appliance shelf centrally disposed horizontally between the plurality of shelf left side braces and the plurality of shelf right side braces.

Embodiments may also include a left drawer slide secured upon a left side of the first appliance shelf. Embodiments may also include a right drawer slide secured upon a right side of the first appliance shelf. Embodiments may also include a first step having a first step frame. Embodiments may also include a first step tread on an upper surface of the first step.

Embodiments may also include a second step having a second step frame. In some embodiments, the shelf frame may be mounted within an open space in the recreational vehicle. In some embodiments, the first appliance shelf may be capable of being moved horizontally in and out of the shelf frame interior by use of the left drawer slide and the right drawer slide. In some embodiments, the first step may be secured to at least one shelf front braces. In some embodiments, the second step may be secured to a first step tread.

In some embodiments, the second step may be positioned on top of the first step and can be pivoted between a deployed position and a non-deployed position via a step hinge. In some embodiments, the sliding shelf assembly may include a latch to retain the first appliance shelf in the retracted position. In some embodiments, the corner posts extend above a shelf height and form a guard to prevent objects from being pushed off the first appliance shelf.

In some embodiments, the second step has a smaller footprint than the first step and can be pivoted on top of the first step. Embodiments may also include a portion of the first step remains accessible when the second step may be in the deployed position. In some embodiments, the first appliance shelf supports a first appliance such as a microwave oven.

In some embodiments, the shelf frame may be mounted using screws and/or bolts to walls, the floor, adjacent furniture, or any combination thereof. In some embodiments, the first appliance shelf and a second appliance shelf may be interchangeable for accommodating different appliances. Embodiments may also include a method of using the sliding shelf assembly may include installing the shelf frame in an open space within a recreational vehicle, coupling a first appliance to the first appliance shelf, and sliding the first appliance shelf between extended and retracted positions.

In some embodiments, the method may include coupling a first step to the front of the shelf frame and coupling a second step to the top of the first step. In some embodiments, the second step may be pivoted to a non-deployed position when the first appliance shelf may be in motion. In some embodiments, the second step may be pivoted to a deployed position for use as a step.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
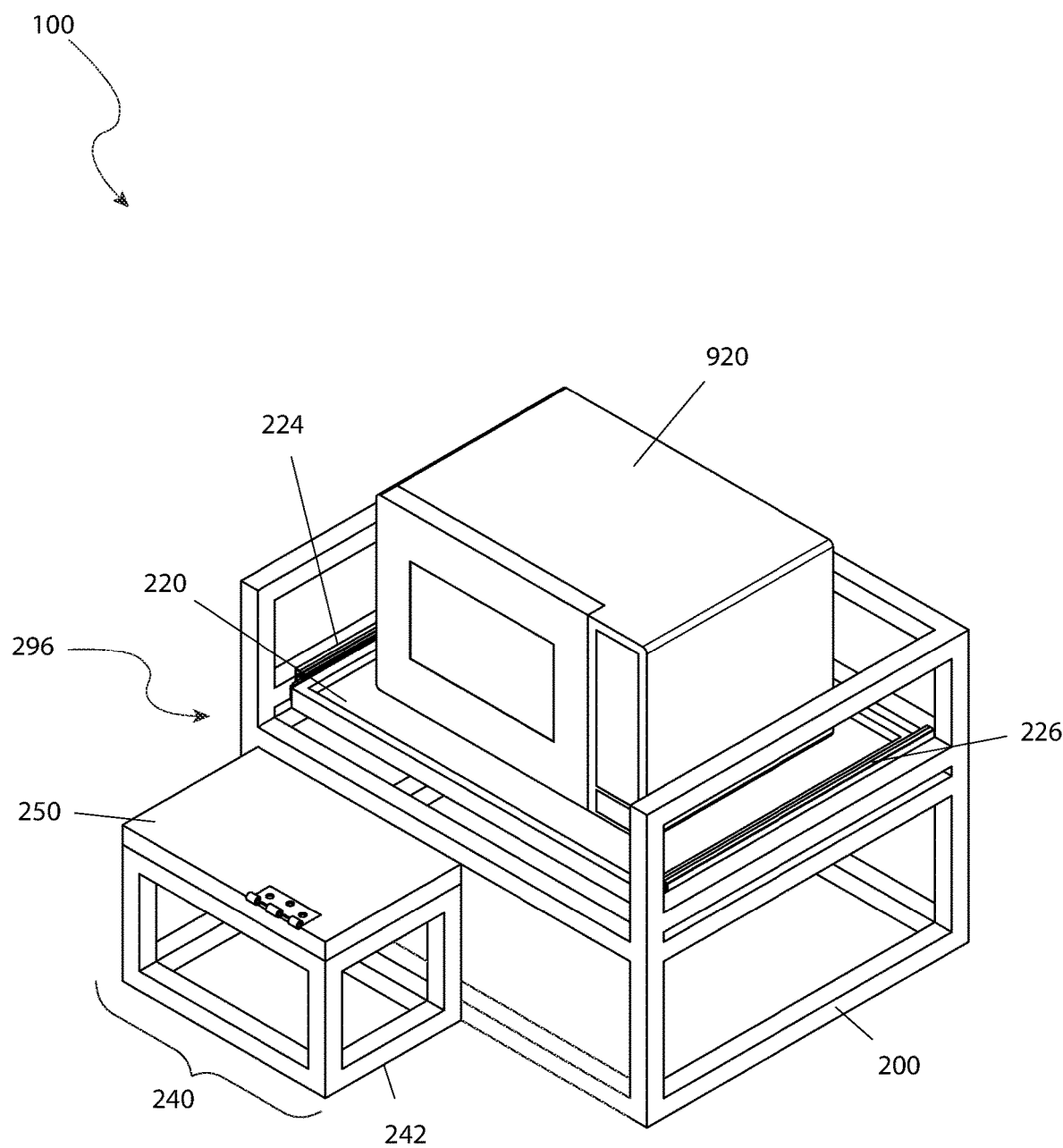
FIG. 1 is an isometric view of an appliance shelf and step assembly 100, according to an embodiment of the present device, illustrating the shelf frame 200, first appliance shelf 220 in the retracted position 296, and the first step 240.
Figure 2:
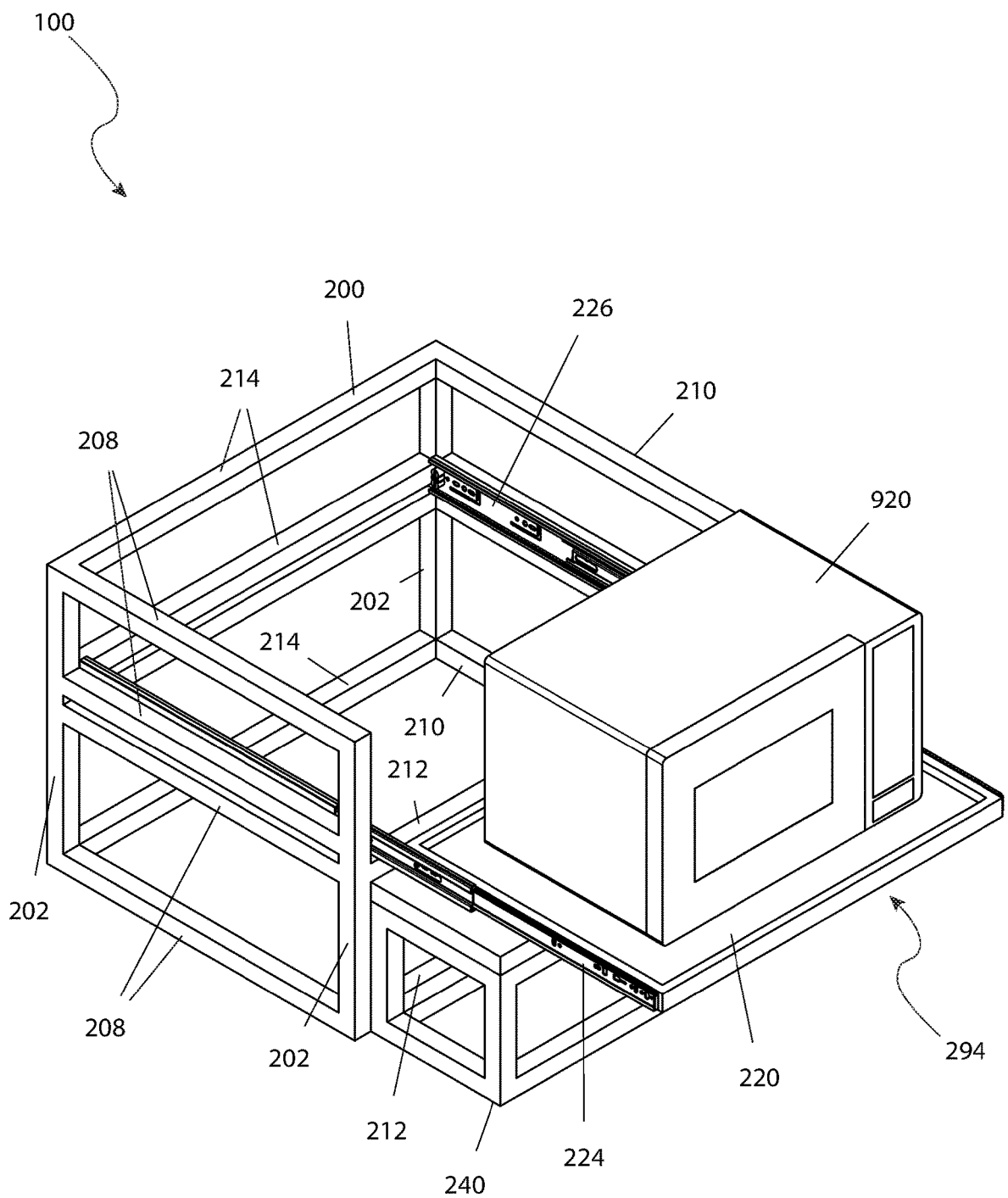
FIG. 2 is an isometric view of an appliance shelf and step assembly 100, according to an embodiment of the present device, illustrating the shelf frame 200, first appliance shelf 220 in the extended position 294, and the first step 240.
Figure 3:
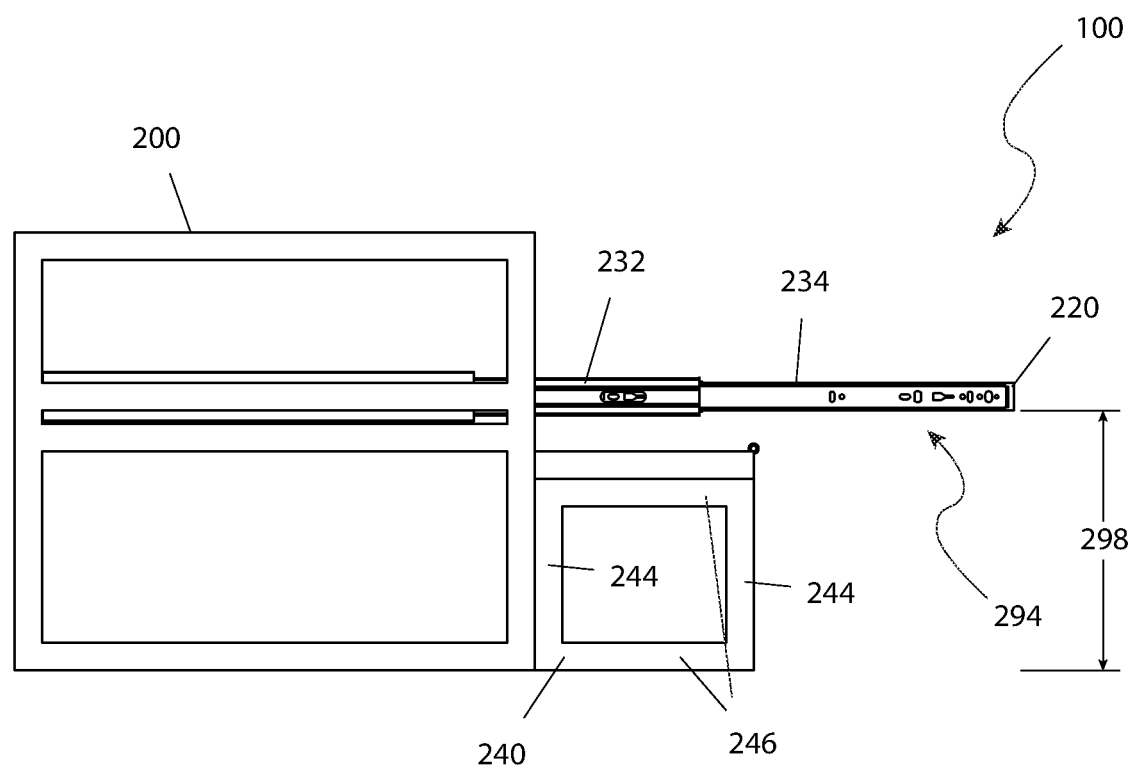
FIG. 3 is a left side view of an appliance shelf and step assembly 100, according to an embodiment of the present device, illustrating the shelf frame 200, first appliance shelf 220 in the extended position 294, and the first step 240.
Figure 4:
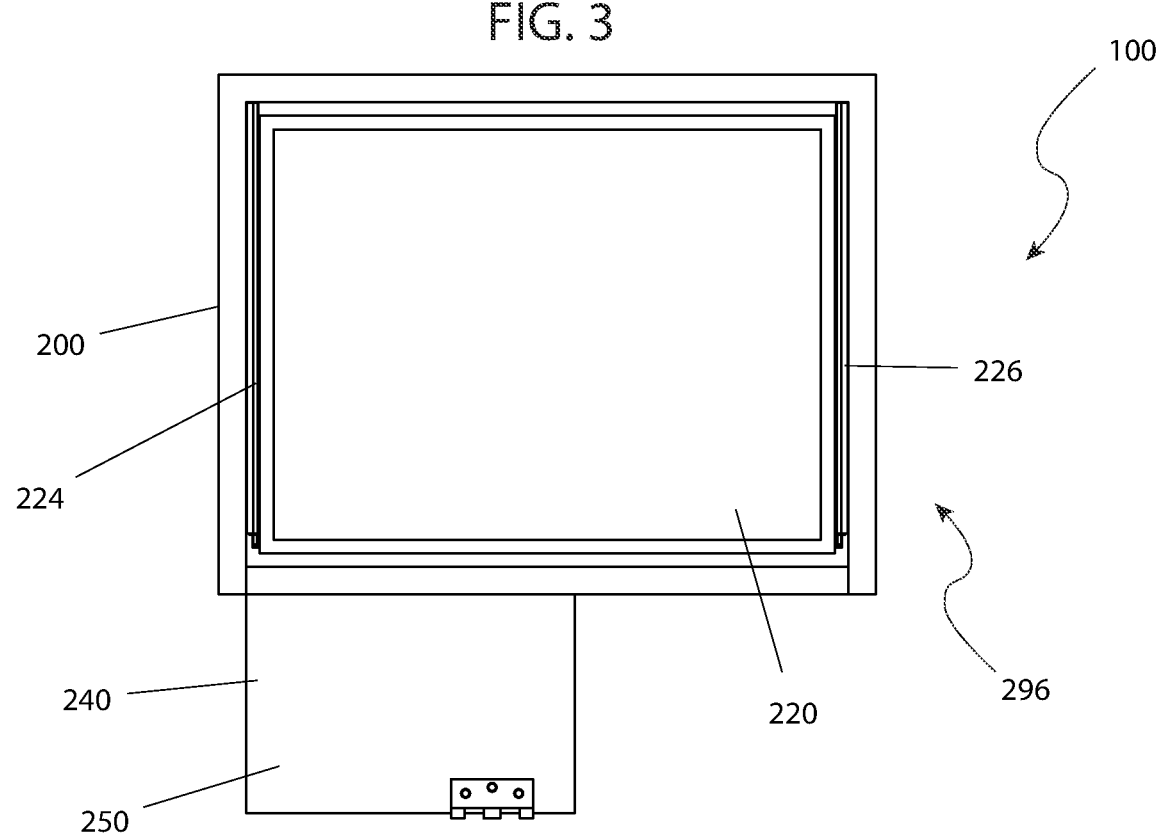
FIG. 4 is a top view of an appliance shelf and step assembly 100, according to an embodiment of the present device, illustrating the shelf frame 200, first appliance shelf 220 in the retracted position 296, and the first step 240.
Figure 5:
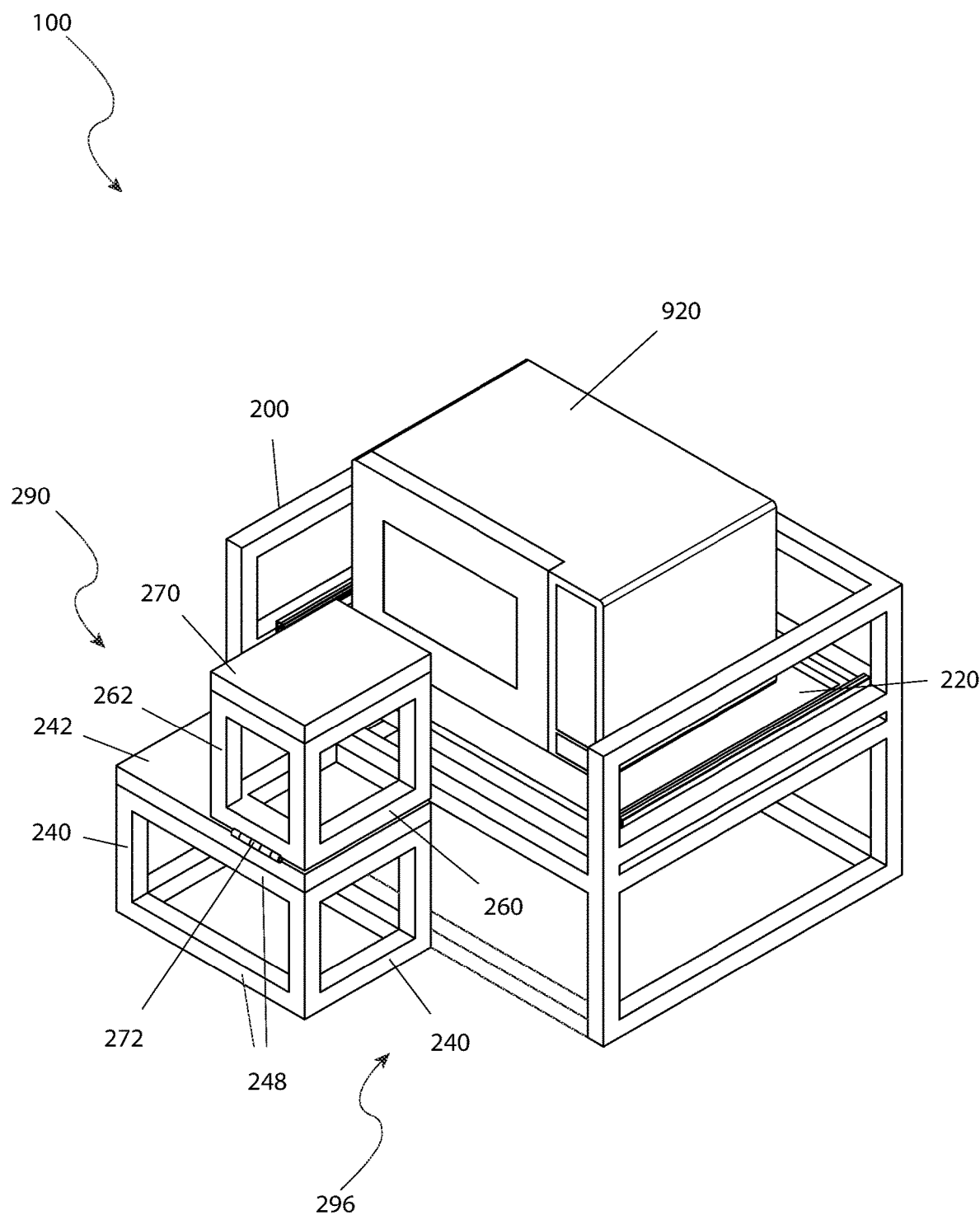
FIG. 5 is an isometric view of an appliance shelf and step assembly 100, according to an embodiment of the present device, illustrating the shelf frame 200, first appliance shelf 220 in the retracted position 296, the first step 240, and the second step 260 in the deployed position 290.
Figure 6:
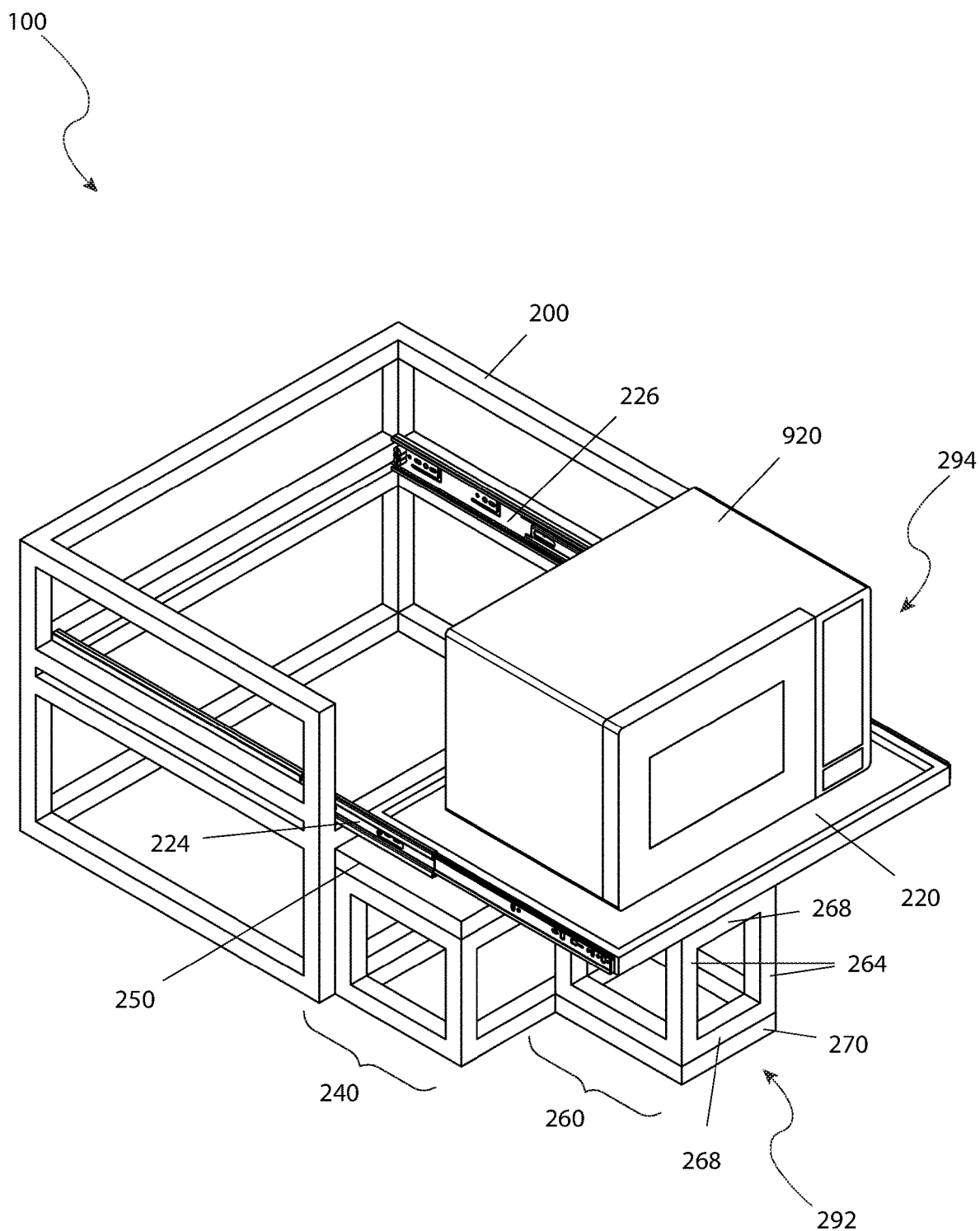
FIG. 6 is an isometric view of an appliance shelf and step assembly 100, according to an embodiment of the present device, illustrating the shelf frame 200, first appliance shelf 220 in the extended position 294, the first step 240, and the second step 260 in the non-deployed position 292; and, FIG. 7 is a right side view of an appliance shelf and step assembly 100, according to an embodiment of the present device, illustrating the shelf frame 200, first appliance shelf in the retracted position 296, the first step 240, and the second step 260 in the deployed position 290.
Figure 7:
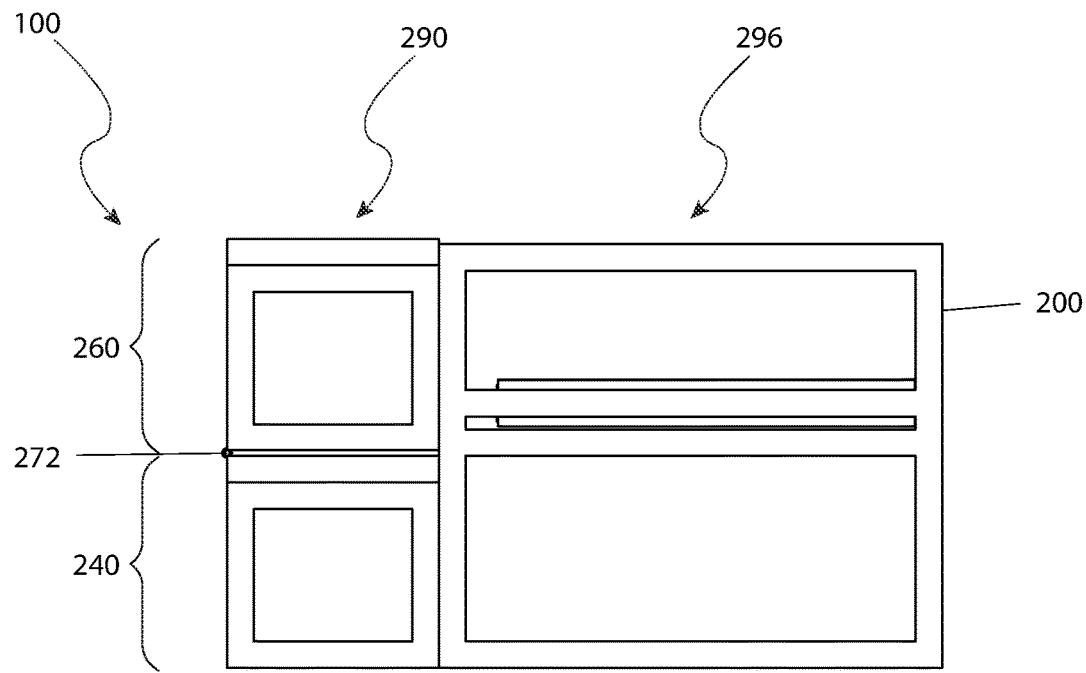
Figure 8:
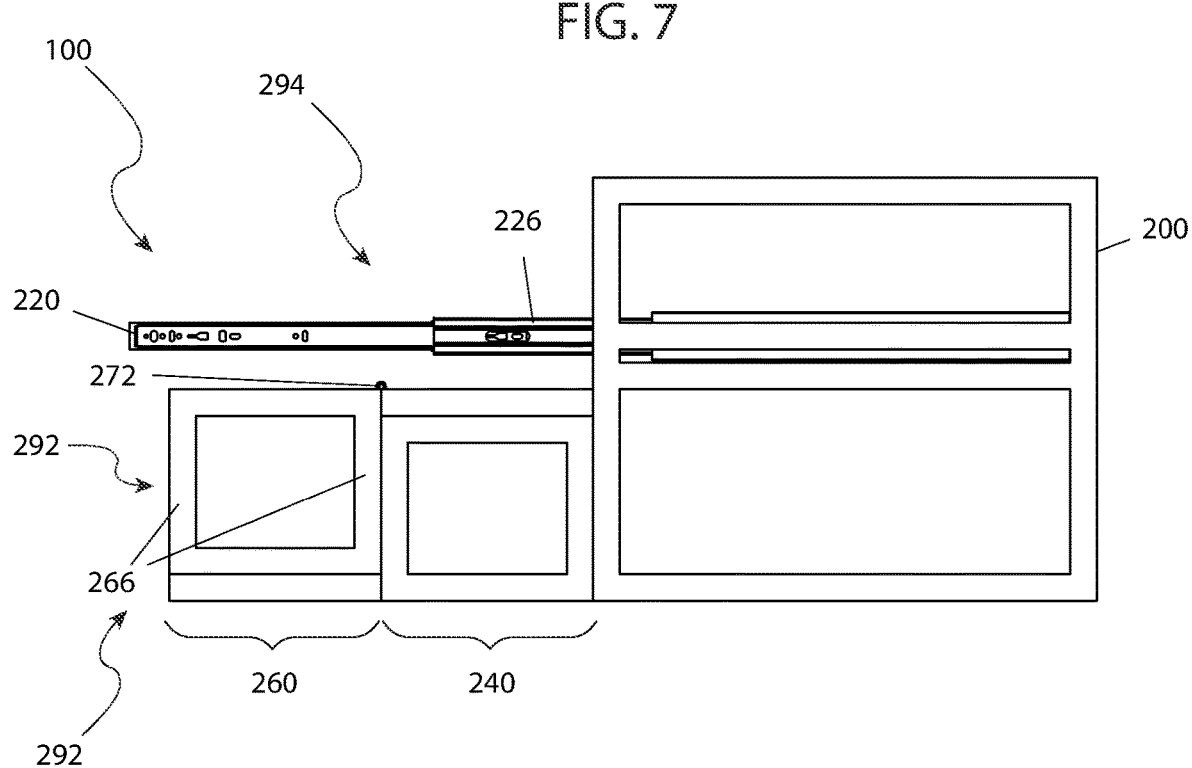
FIG. 8 is a right side view of an appliance shelf and step assembly 100, according to an embodiment of the present device, illustrating the shelf frame 200, first appliance shelf 220 in the extended position 294, the first step 240, and the second step 260 in the non-deployed position 292.
Figure 9:
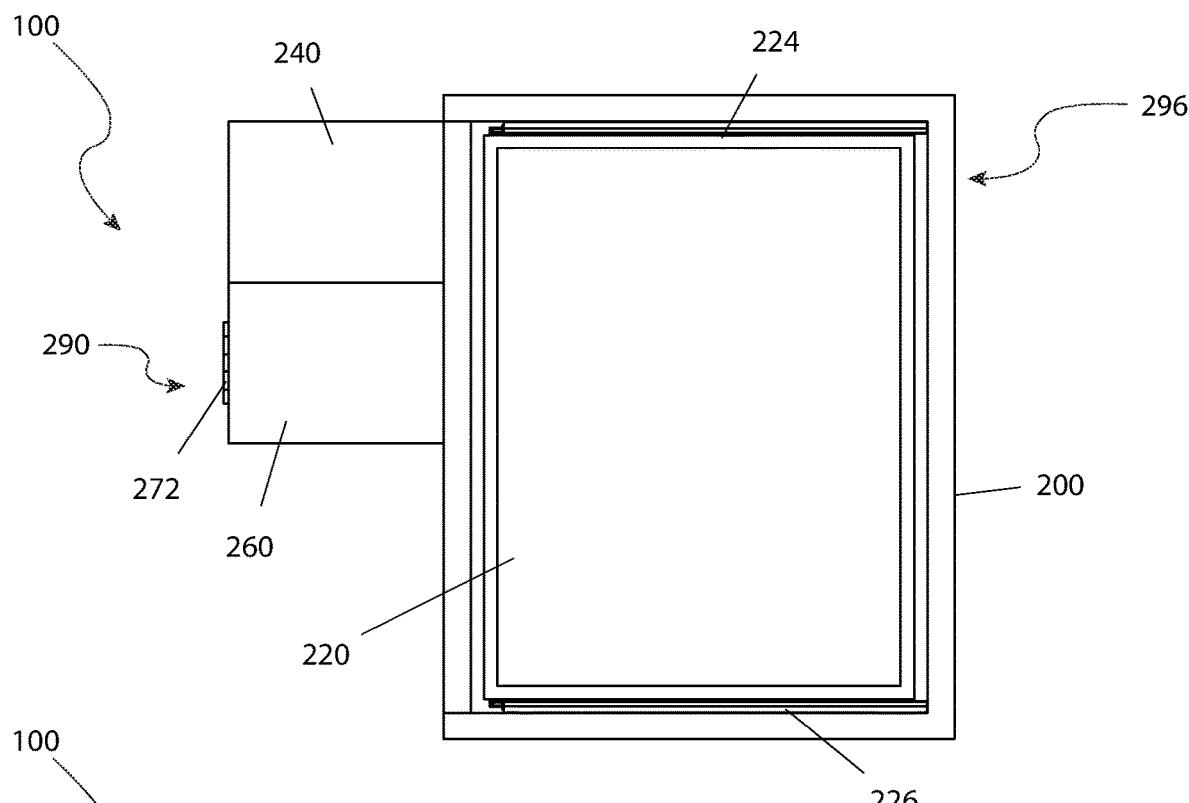
FIG. 9 is a top view of an appliance shelf and step assembly 100, according to an embodiment of the present device, illustrating the shelf frame 200, first appliance shelf in the retracted position 296, the first step 240, and the second step 260 in the deployed position 290; and, FIG. 10 is a top view of an appliance shelf and step assembly 100, according to an embodiment of the present device, illustrating the shelf frame 200, first appliance shelf 220 in the extended position 294, and the first step 240.
Figure 10:
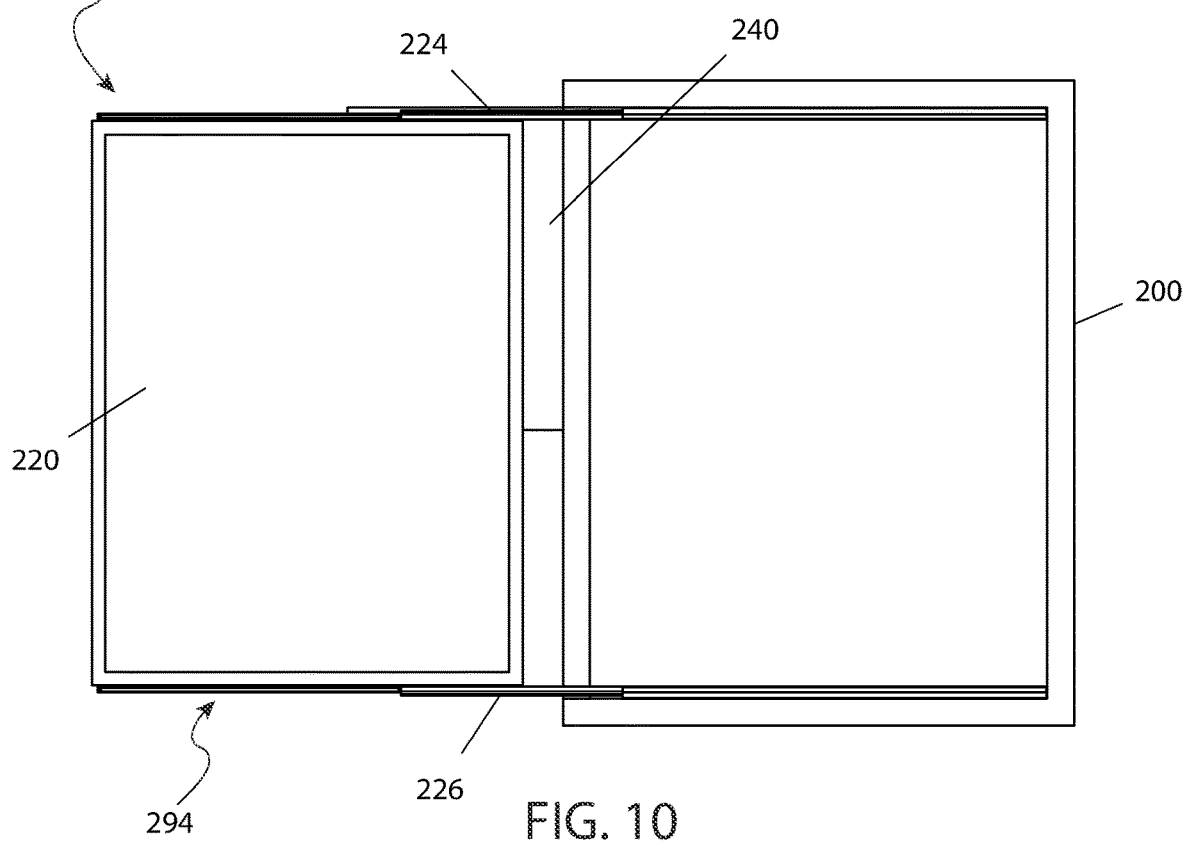

DESCRIPTIVE KEY 100 appliance shelf and step assembly
200 shelf frame
202 shelf corner post
208 shelf left side brace
210 shelf right side brace
212 shelf front brace
214 shelf rear brace
220 first appliance shelf
224 left drawer slide
226 right drawer slide
232 cabinet member
234 drawer member
240 first step
242 first step frame
244 first step corner post
246 first step side brace
248 first step lateral brace
250 first step tread
260 second step
262 second step frame
264 second step corner post
266 second step side brace
268 second step lateral brace
270 second step tread
272 step hinge
290 deployed position
292 non-deployed position
294 shelf extended position
296 shelf retracted position
298 shelf height
920 first appliance

DESCRIPTION OF THE DEVICE

The present device is directed to an appliance shelf and step assembly (herein described as the "device") 100. The appliance shelf and step assembly 100 may comprise a shelf frame 200, a first appliance shelf 220, a first step 240, and a second step 260. The appliance shelf and step assembly 100 may be a sliding shelf that may be mounted in an open space within a recreational vehicle (RV). The first step 240 may be coupled to the shelf frame 200 without interfering with movement of the first appliance shelf 220 and may be adapted for a user to step on in order to get into a bed. The second step 260 may be positioned on top of the first step 240 and may be adapted for the user to step on in order to get into the bed. The second step 260 may pivot from a deployed position 290 to a non-deployed position 292 to eliminate interference with movement of the first appliance shelf 220. As non-limiting examples, the open space may be under a night table, at the end of a walkway adjacent to the bed, or in a storage area under the bed and the first appliance shelf 220 may be used to support a first appliance 920 such as a microwave oven.

The shelf frame 200 may comprise a plurality of shelf corner posts 202, a plurality of shelf left side braces 208, a plurality of shelf right side braces 210, a plurality of shelf front braces 212, and a plurality of shelf rear braces 214. The shelf frame 200 may be the shape of a rectangular cuboid. The shelf frame 200 may be mounted within the open space and may support the first appliance shelf 220 via a pair of drawer slides. As non-limiting examples, the shelf frame 200 may be coupled to one (1) or more walls, the floor, adjacent furniture, or any combination thereof using screws and/or bolts.

The plurality of shelf corner posts 202 may be vertically-oriented armatures support the first appliance shelf 220 at an elevated position herein referred to as a shelf height 298. The plurality of shelf corner posts 202 may be coupled to the plurality of shelf left side braces 208 and to the plurality of shelf right side braces 210 to establish a front-to-rear depth of the shelf frame 200. The plurality of shelf corner posts 202 may be coupled to the plurality of shelf front braces 212 and to the plurality of shelf rear braces 214 to establish a width of the shelf frame 200.

The plurality of shelf corner posts 202 may extend above the shelf height 298. At least one (1) shelf rear brace 214, at least one (1) shelf left side brace 208, and at least one (1) shelf right side braces 210 may be coupled to the plurality of shelf corner posts 202 at a height that is above the shelf height 298 in order to form a guard that may prevent the first appliance 920 from be pushed off of the first appliance shelf 220 towards the rear or either side.

The first appliance shelf 220 may be a rigid, horizontally-oriented platform for supporting one or more objects. As a non-limiting example, the first appliance shelf 220 may support the first appliance 920. In some embodiments, the first appliance 920 may be fastened to the first appliance shelf 220. As non-limiting examples, the first appliance 920 may be coupled to the top surface of the first appliance shelf 220 via one (1) or more brackets, screws, bolts, or any combination thereof.

The first appliance shelf 220 may be movably coupled to the shelf frame 200 via the pair of drawer slides. The pair of drawer slides may comprise a left drawer slide 224 located on the left side of the first appliance shelf 220 and a right drawer slide 226 located on the right side of the first appliance shelf 220. The first appliance shelf 220 may be pulled out of the shelf frame 200 to a shelf extended position 294 and may be pushed into the shelf frame 200 to a shelf retracted position 296. In moving, the first appliance shelf 220 may also move the first appliance 920 forward for use and rearward for storage.

An individual drawer slide selected from the left drawer slide 224 and the right drawer slide 226 may comprise a cabinet member 232 and a drawer member 234. The drawer members 234 may be coupled to the lateral sides of the first appliance shelf 220 such that the drawer members 234 are oriented horizontally. The cabinet members 232 may be coupled to the inside of the shelf frame 200 on both sides of the shelf frame 200 at the shelf height 298 such that the cabinet members 232 are oriented horizontally and separated by a distance that matches the separation distance between the drawer members 234. The first appliance shelf 220 may be inserted into the shelf frame 200 by aligning the drawer members 234 on both sides of the first appliance shelf 220 with the cabinet members 232 on both sides of the shelf frame 200 and then pushing the first appliance shelf 220 into the shelf frame 200.

In some embodiments, the shelf frame 200 may comprise a latch that may be adapted to retain the first appliance shelf 220 in the shelf retracted position 296 unless released by the user.

The first step 240 may couple to the front of the shelf frame 200. The first step 240 may be adapted for the user to stand on in order to climb. As a non-limiting example, the user may stand on the first step 240 in order to climb into the bed.

The first step 240 may comprise a first step frame 242 and a first step tread 250. The first step frame 242 may comprise a plurality of first step corner posts 244, a plurality of first step side braces 246, and a plurality of first step lateral braces 248 coupled to form a rectangular cuboid. The first step tread 250 may be coupled to the top of the first step frame 242. The height of the first step 240 may be less than the shelf height 298 such that the first appliance shelf 220 may be pulled out to a position that is above the first step 240.

The second step 260 may have a smaller footprint than the first step 240 and may pivotably couple to the top of the first step 240. The second step 260 may be adapted for the user to stand on in order to climb. As a non-limiting example, the user may climb onto a portion of the first step 240 that is not covered by the second step 260 and then onto the second step 260 in order to climb into the bed.

The second step 260 may comprise a second step frame 262 and a second step tread 270. The second step frame 262 may comprise a plurality of second step corner posts 264, a plurality of second step side braces 266, and a plurality of second step lateral braces 268 coupled to form a rectangular cuboid. The second step tread 270 may be coupled to the top of the second step frame 262. The height of the second step 260 may be the same as the height of the first step 240 when both the first step 240 and the second step 260 are resting on the floor. The width of the second step 260, measured laterally, may be less than the width of the first step 240 such that a portion of the first step 240 remains accessible with the second step 260 pivoted to the deployed position 290. The depth of the first step 240, measured front to rear, may be the same as the depth of the first step 240.

The second step 260 may couple to the first step 240 via a step hinge 272 such that the second step 260 may pivot down to provide access to the first appliance shelf 220 and the first appliance 920. The step hinge 272 may couple the bottom front of the second step frame 262 to the top front of the first step tread 250. The second step 260 may pivot at the step hinge 272 to the deployed position 290 where the second step 260 rests on top of the first step 240 and to the non-deployed position 292 where the second step 260 may be inverted and resting on the floor in front of the first step 240. The second step 260 in the non-deployed position 292 avoids interference with movement of the first appliance shelf 220.

In a preferred embodiment, the shelf frame 200 may be twenty-four inches with an error of one-half inch (24.0+/−0.5 in.) wide, nineteen inches with an error of one-half inch (19.0+/−0.5 in.) deep, and sixteen inches with an error of one-half inch (16.0+/−0.5 in.) high. The first appliance shelf 220 may be twenty inches with an error of one-half inch (20.0+/−0.5 in.) wide and fifteen inches with an error of one-half inch (15.0+/−0.5 in.) deep. The shelf height 298 may be eight inches with an error of one-half inch (8.0+/−0.5 in.).

The first appliance 920 may be replaced by a second appliance by coupling the first appliance 920 to the first appliance shelf 220 and the second appliance to a second appliance shelf and by swapping the first appliance shelf 220 and the second appliance shelf. In this scenario, the first appliance shelf 220 and the second appliance shelf may each comprise a set of the drawer members 234 coupled to the sides of the shelves and would utilize one (1) common set of the cabinet members 232 coupled to the shelf frame 200.

In use, the shelf frame 200 may be installed in an open space within a recreational vehicle. The first appliance 920 may be coupled to the first appliance shelf 220 and the first appliance shelf 220 may be slidably coupled to the shelf frame 200. The first appliance shelf 220 may be moved between the shelf extended position 294 and the shelf retracted position 296 to make the first appliance 920 accessible for use and to store the first appliance 920 out of the way.

The first step 240 may be coupled to the front of the shelf frame 200 to provide a step for climbing into a bed. The first step 240 will not interfere with movement of the first appliance shelf 220.

The second step 260 may be coupled to the top of the first step 240 to provide an additional step for climbing into the bed. The second step 260 will not interfere with movement of the first appliance shelf 220 when the second step 260 is pivoted to the non-deployed position 292. The second step 260 may be pivoted to the deployed position 290 for use as a step.

The exact specifications, materials used, and method of use of the appliance shelf and step assembly 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A sliding shelf assembly for a recreational vehicle comprising:

a shelf frame having a shelf frame interior further having a cuboid shape comprising:
  a first shelf corner post;
  a second shelf corner post;
  a third shelf corner post;
  a fourth shelf corner post;
  a plurality of shelf left side braces horizontally secured between the first shelf corner post and the second shelf corner post;
  a plurality of shelf rear side braces horizontally secured between the second shelf corner post and the third shelf corner post;
  a plurality of shelf right side braces horizontally secured between the third shelf corner post and the fourth shelf corner post;
  a plurality of shelf front braces horizontally secured between the fourth shelf corner post and the first shelf corner post;
a first appliance shelf centrally disposed horizontally between the plurality of shelf left side braces and the plurality of shelf right side braces;
a left drawer slide secured upon a left side of the first appliance shelf;
a right drawer slide secured upon a right side of the first appliance shelf;
a first step having a first step frame;
a first step tread on an upper surface of the first step;
a second step having a second step frame; and,
wherein the shelf frame is mounted within an open space in the recreational vehicle;
wherein the first appliance shelf is capable of being moved horizontally in and out of the shelf frame interior by use of the left drawer slide and the right drawer slide;
wherein the first step is secured to at least one of the shelf front braces; and,
wherein the second step is secured to a first step tread.

2. The sliding shelf assembly for a recreational vehicle of claim 1, wherein the second step is positioned on top of the first step and can be pivoted between a deployed position and a non-deployed position via a step hinge.

3. The sliding shelf assembly for a recreational vehicle of claim 1, wherein the corner posts extend above a shelf height and form a guard to prevent objects from being pushed off the first appliance shelf.

4. The sliding shelf assembly for a recreational vehicle of claim 1, wherein the second step has a smaller footprint than the first step and can be pivoted on top of the first step.

5. The sliding shelf assembly for a recreational vehicle of claim 4, wherein a portion of the first step remains accessible when the second step is in the deployed position.

6. The sliding shelf assembly for a recreational vehicle of claim 1, wherein the first appliance shelf supports a first appliance.

7. The sliding shelf assembly for a recreational vehicle of claim 1, wherein the shelf frame is mounted using screws and/or bolts to walls, floor, adjacent furniture, or any combination thereof.

8. The sliding shelf assembly for a recreational vehicle of claim 1, wherein the first appliance shelf and a second appliance shelf are interchangeable for accommodating different appliances.

9. A method of using the sliding shelf assembly for a recreational vehicle of claim 1, comprising installing the shelf frame in an open space within a recreational vehicle, coupling a first appliance to the first appliance shelf, and sliding the first appliance shelf between extended and retracted positions.

10. The method of claim 9, further comprising coupling the first step to the front of the shelf frame and coupling the second step to the top of the first step.

11. The method of claim 10, wherein the second step is pivoted to a non-deployed position when the first appliance shelf is in motion.

12. The method of claim 11, wherein the second step is pivoted to a deployed position for use as a step.

* * * * *